(12) United States Patent
Wang et al.

(10) Patent No.: US 10,834,202 B2
(45) Date of Patent: Nov. 10, 2020

(54) NETWORK SERVICE SYSTEM AND NETWORK SERVICE METHOD

(71) Applicant: Industrial Technology Research Institute, Hsinchu (TW)

(72) Inventors: Wei-Cheng Wang, Taichung (TW); Wen-Pin Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/231,449

(22) Filed: Dec. 22, 2018

(65) Prior Publication Data

US 2020/0169609 A1 May 28, 2020

(30) Foreign Application Priority Data

Nov. 23, 2018 (TW) .............................. 107141778 A

(51) Int. Cl.
*G06F 15/173* (2006.01)
*H04L 29/08* (2006.01)
*H04W 4/60* (2018.01)
*H04L 29/12* (2006.01)
*H04W 8/18* (2009.01)

(52) U.S. Cl.
CPC ........ *H04L 67/125* (2013.01); *H04L 61/6054* (2013.01); *H04L 67/16* (2013.01);
(Continued)

(58) Field of Classification Search
CPC ... H04L 67/125; H04L 67/16; H04L 67/2814; H04L 67/327; H04L 61/6054; H04W 4/60; H04W 8/18
See application file for complete search history.

(56) References Cited

U.S. PATENT DOCUMENTS

| 7,760,729 B2 | 7/2010 | Srisuresh et al. |
| 9,877,182 B2 | 1/2018 | Yang et al. |

(Continued)

FOREIGN PATENT DOCUMENTS

| CN | 101977242 A | 2/2011 |
| CN | 108243409 A1 | 7/2018 |

(Continued)

OTHER PUBLICATIONS

European Patent Office, Search Report, Application No. 18214670.4, dated May 27, 2019, Europe.

(Continued)

*Primary Examiner* — Sm A Rahman

(57) ABSTRACT

A network service method includes: a core cloud server returns all running service identification information; a multi-access edge computing cloud server receives a service request from a terminal device; and the multi-access edge computing cloud server determines whether an application that corresponds to the service request exists in the multi-access edge computing cloud server, according to the service identification information reported by the core cloud server; after the multi-access edge computing cloud server integrates the current state with the application being run by the multi-access edge computing cloud server, the terminal device is directed to the multi-access edge computing cloud server, and the multi-access edge computing cloud server provides the application to the terminal device.

10 Claims, 4 Drawing Sheets

(52) U.S. Cl.
CPC ........ *H04L 67/2814* (2013.01); *H04L 67/327* (2013.01); *H04W 4/60* (2018.02); *H04W 8/18* (2013.01)

(56) References Cited

U.S. PATENT DOCUMENTS

| | | | |
|---|---|---|---|
| 2001/0028636 | A1 | 10/2001 | Skog et al. |
| 2005/0273668 | A1 | 12/2005 | Manning |
| 2008/0162637 | A1* | 7/2008 | Adamczyk ............ H04L 51/043 709/204 |
| 2015/0245160 | A1 | 8/2015 | Agrawal et al. |
| 2017/0005515 | A1* | 1/2017 | Sanders .................. H02J 3/381 |
| 2019/0313160 | A1* | 10/2019 | Stokking ............ H04N 21/8456 |

FOREIGN PATENT DOCUMENTS

| | | |
|---|---|---|
| EP | 3313033 A1 | 4/2018 |
| TW | 201801548 | 1/2018 |
| WO | WO2017071924 | 5/2017 |
| WO | WO 2017/100640 A1 | 6/2017 |
| WO | WO2017088501 | 6/2017 |
| WO | WO2017194080 | 11/2017 |
| WO | WO 2018/040096 A1 | 3/2018 |
| WO | WO2018126156 | 7/2018 |
| WO | WO2018176439 | 10/2018 |

OTHER PUBLICATIONS

European Patent Office, Search Report, Application No. 18214905.4, dated Jul. 1, 2019, Europe.

Taiwan Patent Office, Office Action, Application Serial No. 107141778, dated May 24, 2019, Taiwan.

Taiwan Patent Office, Office Action, Application Serial No. 107141780, dated May 24, 2019, Taiwan.

Sardis et al., "Dynamic Edge-Caching for Mobile Users: Minimising Inter-AS traffic by Moving Cloud Services and VMs," 2014 28th International Conference on Advanced Information Networking and Applications Workshops, May 2014, pp. 144-149, IEEE, US.

Liu et al., "Mobile Edge Cloud System: Architectures, Challenges, and Approaches," IEEE Systems Journal, Sep. 2018, pp. 2495-2508, vol. 12, Issue 3, IEEE, US.

Sciancalepore et al., "A double-tier MEC-NFV architecture: Design and optimisation," 2016 IEEE Conference on Standards for Communications and Networking (CSCN). Nov. 2016, 6 pages, IEEE, US.

Wang et al., "Dynamic service migration in mobile edge-clouds," 2015 IFIP Networking Conference (IFIP Networking), May 2015, 9 pages, IFIP, US.

Zhang et al., "Mobile edge computing and field trial results for 5G low latency scenario," China Communications, 2016, pp. 174-182, IEEE, US.

Jararweh et al., "The future of mobile cloud computing: Integrating cloudlets and Mobile Edge Computing," 2016 23rd International Conference on Telecommunications (ICT), May 2016, 5 pages, IEEE, US.

Robin Harris, "Google's 650,000-core warehouse-size computer," Oct. 2007, 15 pages, ZDNet, US.

Rolf Schuster, "Boosting User Experience by Innovating at the Mobile Network Edge," Vodafone, Nov. 2015, 14 pages, US.

* cited by examiner

NETWORK SERVICE SYSTEM AND NETWORK SERVICE METHOD

CROSS-REFERENCE TO RELATED APPLICATION

The present application is based on, and claims priority from, Taiwan (International) Application Serial Number 107141778, filed Nov. 23, 2018, the disclosure of which is hereby incorporated by reference herein.

TECHNICAL FIELD

Technical Field

The present disclosure relates to a system and a method for providing network service, and in particular it relates to a network service system and a network service method.

BACKGROUND

In general, a multi-access edge computing (MEC) platform can find out what service a terminal device wants to use by identifying the query command of the Domain Name System (DNS), and quickly finding the service in the MEC. This service is deployed in the MEC. Finally, a packet sent by the terminal device is transmitted to the MEC service through the control route, and the MEC provides service to the terminal device.

When the MEC has an image file relating to the service but has not yet run the service, the service's image file is mounted or executed in preparation for access by the terminal device. However, this process requires a certain wait time. In addition, when there are too many services that have been requested by the terminal device, the resources of the MEC may not be sufficient to run all the services requested by the terminal device.

Therefore, how to provide a method and system for using MEC efficiently has become one of the challenges in the field.

SUMMARY

The present disclosure provides a network service system. The network service system comprises a core cloud server and a multi-access edge computing cloud server. The core cloud server returns all running service identification information. The multi-access edge computing cloud server receives a service request from a terminal device. The multi-access edge computing cloud server determines whether an application corresponding to the service request exists in the multi-access edge computing cloud server according to the service identification information reported by the core cloud server. When the multi-access edge computing cloud server determines that the application corresponding to the service request does not exist in the multi-access edge computing cloud server, the terminal device is directed to the core cloud server, and the core cloud server provides the application to the terminal device. The multi-access edge computing cloud server runs the application, and the core cloud server transmits the current state of the application being run by the core cloud server to the multi-access edge computing cloud server. After the multi-access edge computing cloud server integrates the current state with the application being run by the multi-access edge computing cloud server, the terminal device is directed to the multi-access edge computing cloud server, and the multi-access edge computing cloud server provides the application to the terminal device.

The present disclosure provides a network service method. The network service method comprises: a core cloud server returns all running service identification information; a multi-access edge computing cloud server receives a service request from a terminal device; the multi-access edge computing cloud server determines whether an application that corresponds to the service request exists in the multi-access edge computing cloud server, according to the service identification information reported by the core cloud server; and after the multi-access edge computing cloud server integrates the current state with the application being run by the multi-access edge computing cloud server, the terminal device is directed to the multi-access edge computing cloud server, and the multi-access edge computing cloud server provides the application to the terminal device.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
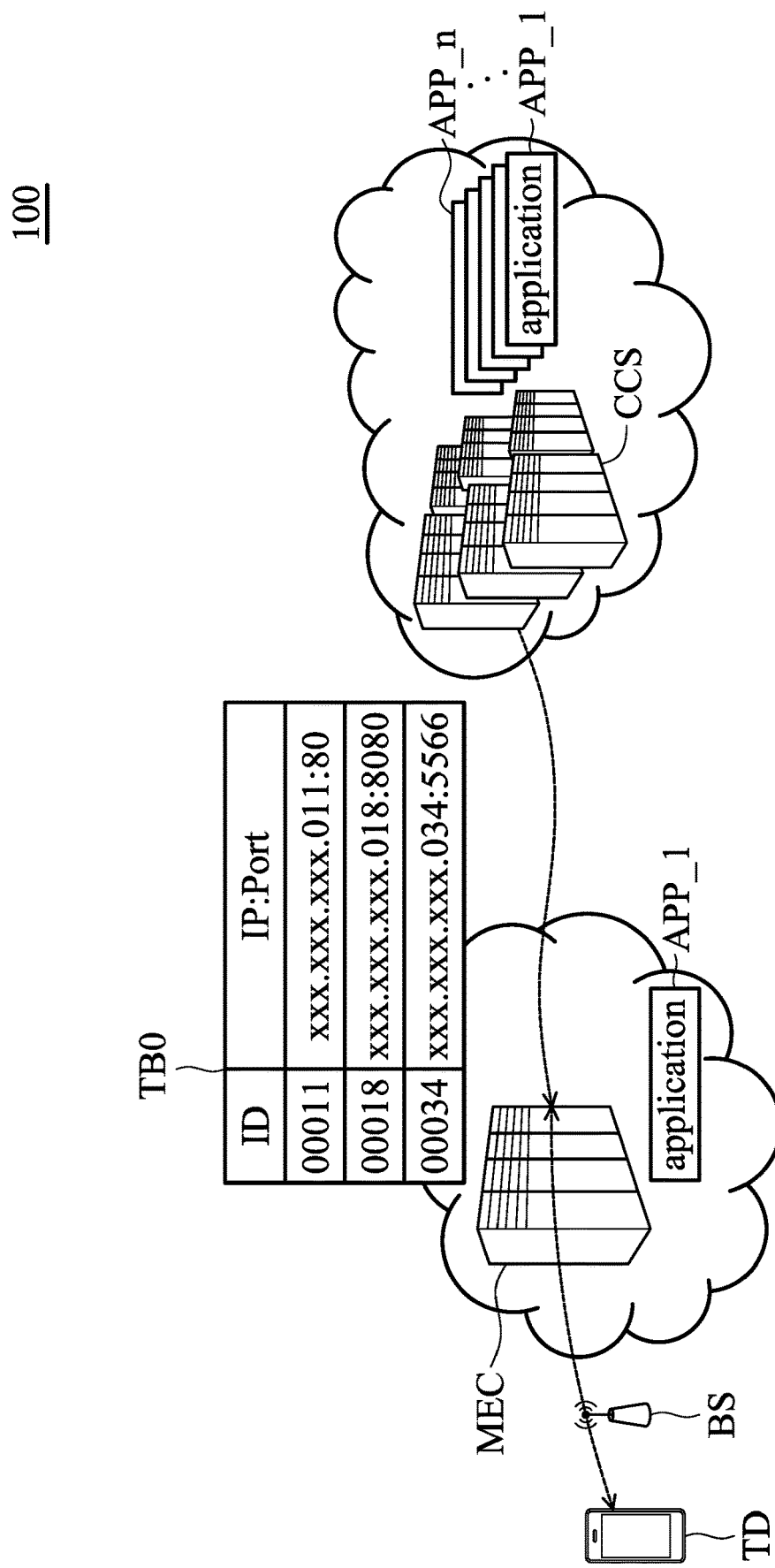
FIG. 1 is a block diagram of a network service system in accordance with one embodiment of the present disclosure.
Figure 2:
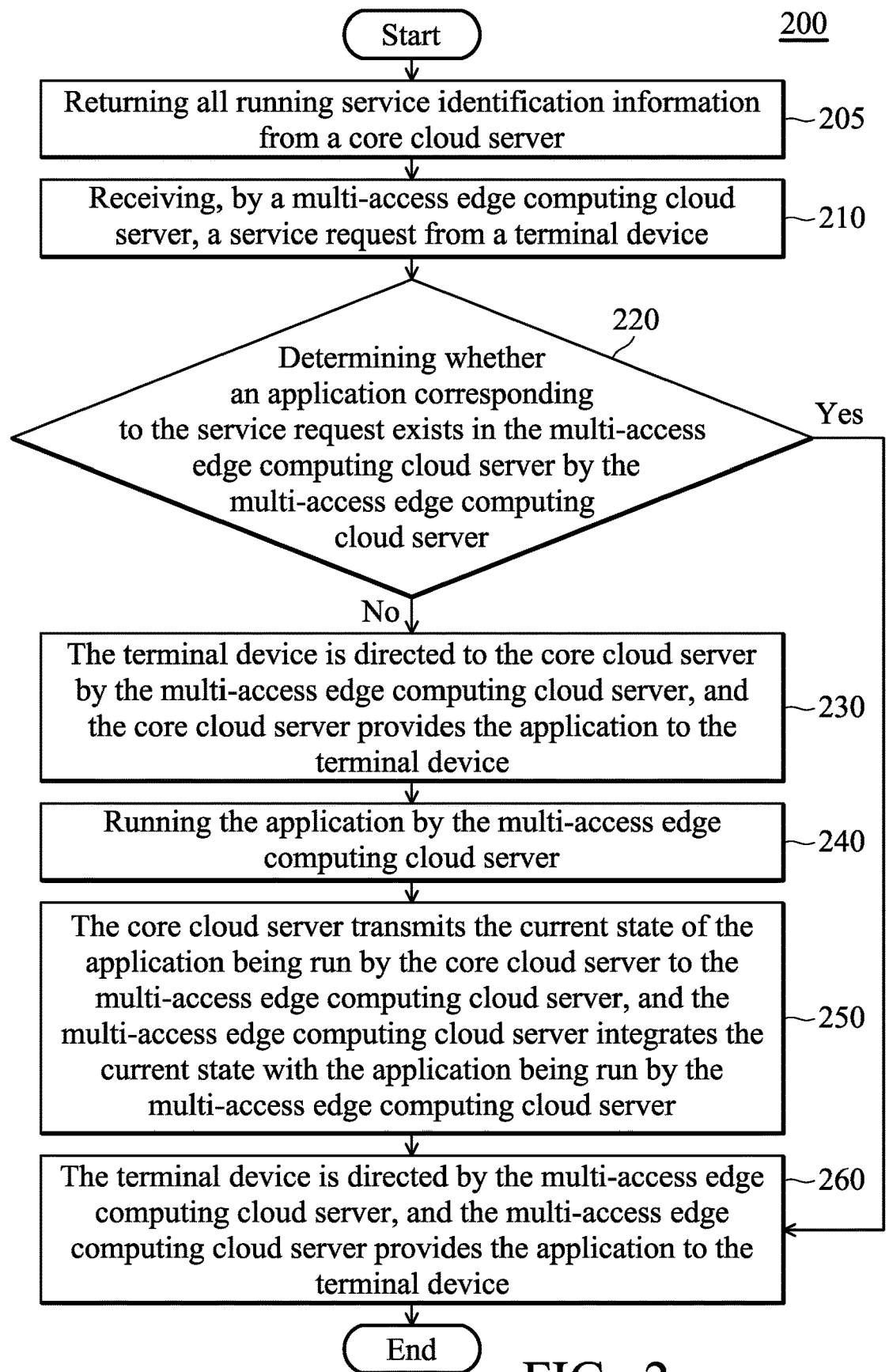
FIG. 2 is a flowchart of a network service method in accordance with one embodiment of the present disclosure.

Please refer to FIGS. 1-2, FIG. 1 is a block diagram of a network service system 100 in accordance with one embodiment of the present disclosure. FIG. 2 is a flowchart of a network service method 200 in accordance with one embodiment of the present disclosure.

In FIG. 1, the network service system 100 includes a multi-access edge computing (MEC) server MEC and a core cloud server CCS. In one embodiment, the multi-access edge computing cloud server MEC can be one or more servers, one or more computers, and/or other devices with computation function that are closer to the terminal device TD. The core cloud server CCS can be one or more servers remote from the terminal device TD, one or more computers, and/or other devices with computation function.

In one embodiment, the core cloud server CCS has higher computing ability and the higher storage space than the multi-access edge computing cloud server MEC. Since the multi-access edge computing cloud server MEC is closer to the terminal device TD, the terminal device TD can communicate with the multi-access edge computing cloud server MEC through the adjacent base station BS. Thus, the time required for the multi-access edge computing cloud server MEC to provide services (e.g., applications) to the terminal device TD is shorter.

Please refer to FIG. 1 and to FIG. 2. The network service method 200 is described further below.

In step 205, the core cloud server CCS returns all running service identification information. In step 210, the multi-access edge computing cloud server MEC receives a service request from a terminal device TD. In one embodiment, the service identification information comprises the service identification code of the application, an Internet protocol (IP) address of the application, and a port number of the application corresponding to the service request.

In one embodiment, the service request can be, for example, a service for the terminal device TD to access a YouTube movie, to open a Facebook application, to open a communication software (for example, Line, WeChat, WhatsApp), and the like.

In one embodiment, the terminal device TD transmits the service request to the multi-access edge computing cloud server MEC through the neighboring base station BS to inform the terminal device TD of the required service (or application).

In one embodiment, the core cloud server CCS can run multiple applications simultaneously.

In step 220, the multi-access edge computing cloud server MEC determines whether an application corresponding to the service request exists in the multi-access edge computing cloud server MEC according to the service identification information reported by the core cloud server CCS. If the multi-access edge computing cloud server MEC determines that the application corresponding to the service request exists in the multi-access edge computing cloud server MEC, step 260 is performed. If the multi-access edge computing cloud server MEC determines that the application corresponding to the service request does not exist in the multi-access edge computing cloud server MEC, step 230 is performed.

In one embodiment, the multi-access edge computing cloud server MEC retrieves the Internet protocol address and the port number included in the service request to determine whether the application corresponding to the service request exists in the multi-access edge computing cloud server MEC. For example, in FIG. 1, the multi-access edge computing cloud server MEC uses the Internet protocol address and the port number to determine whether an application APP_1 corresponding to the service request exists in an identification correspondence table TB0. If so, then step 260 is performed. If not, then step 230 is performed.

In one embodiment, the identification correspondence table TB0 includes a service request ID column for recording the code of the application corresponding to the service request.

In one embodiment, after the core cloud server CCS transmits the service identification information (e.g., the service identification information of application APP_1) to the multi-access edge computing cloud server MEC, the multi-access edge computing cloud server MEC records the Internet protocol address and the port number corresponding to the application (e.g., the application APP_1) in the identification correspondence table TB0.

In step 230, the terminal device TD is directed to the core cloud server CCS by the multi-access edge computing cloud server MEC, and the core cloud server CCS provides the application to the terminal device TD.

For example, in FIG. 1, the application APP_n corresponding to the service request requested by the terminal device TD does not exist in the multi-access edge computing cloud server MEC, the terminal device TD is directed to the core cloud server CCS by the multi-access edge computing cloud server MEC to make the terminal device TD obtain the address of the application APP_n from the core cloud server CCS. Therefore, the terminal device TD can access the application APP_n from the core cloud server CCS.

In step 240, the multi-access edge computing cloud server MEC runs the application.

In one embodiment, in FIG. 1, the application APP_n corresponding to the service request requested by the terminal device TD does not exist in the multi-access edge computing cloud server MEC, the terminal device TD is directed to the core cloud server CCS by the multi-access edge computing cloud server MEC to make the terminal device TD obtain the address of the application APP_n from the core cloud server CCS. The core cloud server CCS can provide the application APP_n to the terminal device TD. At the same time, the multi-access edge computing cloud server MEC starts to run the image file of the application APP_n.

In one embodiment, the method that is used by the multi-access edge computing cloud server MEC to start to run the image file of the application APP_n can be, for example, for the multi-access edge computing cloud server MEC to start to mount or decompress the image file of the application APP_n until the mounting or the installation is completed.

In step 250, the core cloud server CCS transmits the current state of the application being run by the core cloud server CCS to the multi-access edge computing cloud server MEC, and the multi-access edge computing cloud server MEC integrates the current state with the application being run by the multi-access edge computing cloud server MEC.

In one embodiment, after the multi-access edge computing cloud server MEC integrates the current state with the application being run by the multi-access edge computing cloud server MEC, the multi-access edge computing cloud server MEC runs the application having the same current state as the application running on the core cloud server CCS.

In one embodiment, if the application requested by the terminal device TD is YouTube, and the multi-access edge computing cloud server MEC determines that the application YouTube requested by the terminal device TD does not exist in the multi-access edge computing cloud server MEC (step 220), the multi-access edge computing cloud server MEC directs the terminal device TD to the core cloud server CCS (step 230). The terminal device TD obtains the address of the application YouTube from the core cloud server CCS. The terminal device TD starts to display a movie. At the same time, the multi-access edge computing cloud server MEC starts running the application YouTube (for example, after loading the application YouTube, the status of the application YouTube can be accessed at any time). Then, the core cloud server CCS transmits the current state of the application YouTube (for example, the name of the movie being played and the number of minutes that the terminal device TD has displayed) to the multi-access edge computing cloud server MEC. The multi-access edge computing cloud server MEC integrates the current state with the application YouTube being run by the edge computing cloud server MEC, so that the application YouTube running on the multi-access edge computing cloud server MEC has the same current state as the application YouTube running on the core cloud server CCS.

In one embodiment, if the application requested by the terminal device TD is a communication software (e.g., Line), and the multi-access edge computing cloud server MEC determines that the application Line requested by the terminal device TD does not exist in the multi-access edge computing cloud server MEC (step 220), the multi-access edge computing cloud server MEC directs the terminal device TD to the core cloud server CCS (step 230). The terminal device TD obtains the address of the application Line from the core cloud server CCS. The terminal device TD starts communicating with the contacts. At the same time, the multi-access edge computing cloud server MEC starts running the application Line (for example, after loading the application Line, the status of the application Line can be accessed at any time). Then, the core cloud server CCS transmits the current state of the application Line (for example, contact list and chat information) to the multi-access edge computing cloud server MEC. The multi-access edge computing cloud server MEC integrates the current state with the application Line being run by the edge computing cloud server MEC, so that the application Line running on the multi-access edge computing cloud server MEC has the same current state as the application Line running on the core cloud server CCS.

In step 260, the terminal device TD is directed by the multi-access edge computing cloud server MEC, and the multi-access edge computing cloud server MEC provides the application to the terminal device TD.

In one embodiment, when the multi-access edge computing cloud server MEC determines that the application corresponding to the service request exists in the multi-access edge computing cloud server MEC, the multi-access edge computing cloud server MEC provides the application directly to the terminal device TD. For example, in FIG. 1, the multi-access edge computing cloud server MEC determines that the application APP_1 corresponding to the service request exists in the multi-access edge computing cloud server MEC, the multi-access edge computing cloud server MEC provides the application APP_1 directly to the terminal device TD. Therefore, it can provide services (such as applications) to the terminal device TD more efficiently.

In one embodiment, if the application requested by the terminal device TD is YouTube, the multi-access edge computing cloud server MEC directs the terminal device TD to the application YouTube provided by the multi-access edge computing cloud server MEC. At this time, since the multi-access edge computing cloud server MEC has enabled the application YouTube running on the multi-access edge computing cloud server MEC to have the same current state as the application YouTube running on the core cloud server CCS in step 250. Thus, when the multi-access edge computing cloud server MEC switches the terminal device TD to the application YouTube provided by the multi-access edge computing cloud server MEC, the terminal device TD can continue to watch the movie, without jumping to the home page, jumping to another movie, or restarting the movie.

In one embodiment, if the application requested by the terminal device TD is Line, the multi-access edge computing cloud server MEC directs the terminal device TD to the application Line provided by the multi-access edge computing cloud server MEC. At this time, since the multi-access edge computing cloud server MEC has enabled the application YouTube running on the multi-access edge computing cloud server MEC to have the same current state as the application Line running on the core cloud server CCS in step 250. Thus, when the multi-access edge computing cloud server MEC switches the terminal device TD to the application Line provided by the multi-access edge computing cloud server MEC, the terminal device TD can continue to communicate with the contact. There will not be the status where the contact disappears or the chat history disappears.

Figure 3:
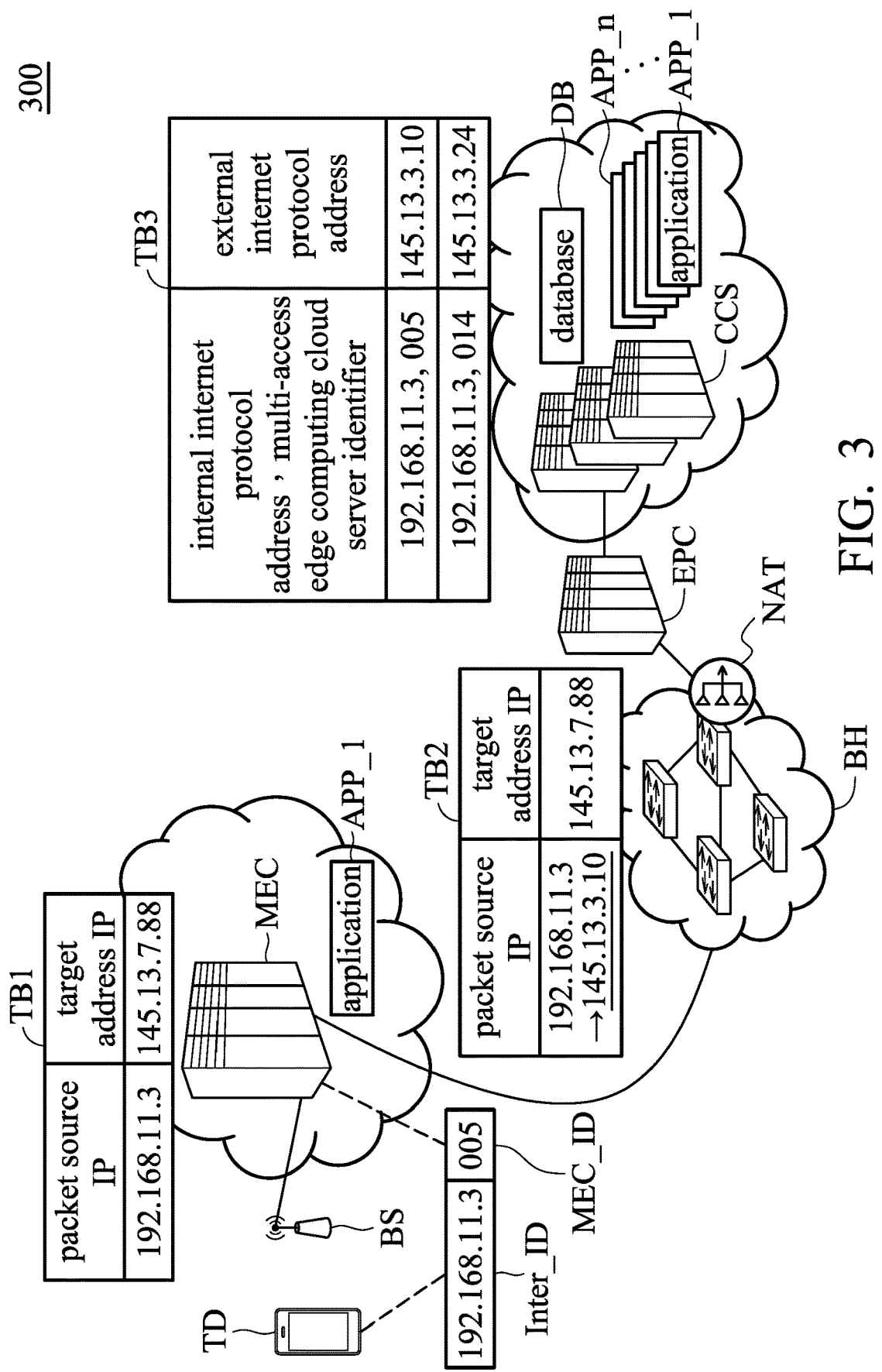
FIG. 3 is a schematic diagram of a network service system in accordance with one embodiment of the present disclosure.
Figure 4:
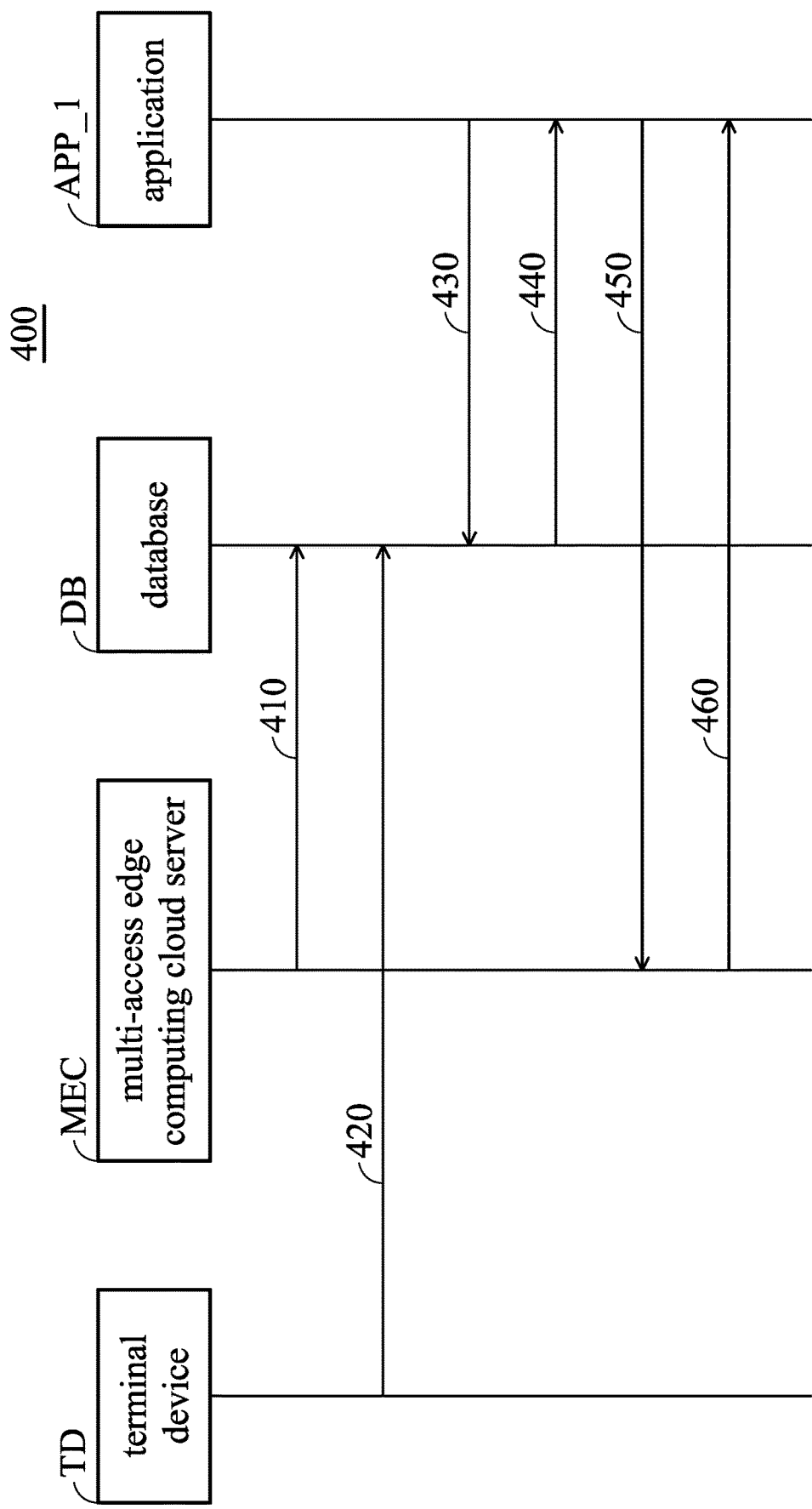
FIG. 4 is a schematic diagram of a network service method in accordance with one embodiment of the present disclosure.

Please refer to FIGS. 3-4, FIG. 3 is a schematic diagram of a network service system 300 in accordance with one embodiment of the present disclosure. FIG. 4 is a schematic diagram of a network service method 400 in accordance with one embodiment of the present disclosure.

In one embodiment, when the terminal device TD communicates with the multi-access edge computing cloud server MEC, the internal Internet protocol address Inter_ID is used for communication between the terminal device TD and the multi-access edge computing cloud server MEC. For example, the packet transmitted by the terminal device TD to the multi-access edge computing cloud server MEC includes an internal Internet protocol address Inter_ID and a packet target address IP. The terminal device TD communicates with the core cloud server CCS uses an external Internet protocol address for communication between the terminal device TD communicates with the core cloud server CCS.

The core network in the 4G mobile network is also called evolved packet core (EPC). The core network has a packet data network gate way (PGW), which is part of the core network of the evolved data packet. When the packet passes through the packet data gateway PGW in the evolved data packet core network EPC, the packet data network gateway translates the packet's internal Internet protocol address Inter_ID into an external Internet protocol address for communication. Therefore, if the evolved packet core EPC is not in the multi-access edge computing cloud server MEC, the core cloud server CCS will see the external Internet protocol address of the packet.

In some examples, when a packet with an internal Internet protocol address Inter_ID comes to a network address translation (NAT) through multiple routers and multiple switches BH, the network address translation NAT also translates the packet's internal Internet Protocol address, Inter_ID into external Internet Protocol address for communication.

Therefore, the edge computing cloud server MEC sees that the packet source IP is the internal Internet protocol address Inter_ID (for example, 192.168.11.3). The core cloud server CCS sees that the packet source IP is the external Internet protocol address (for example, 145.13.3.10). The correspondence between the conversions is only known to the data gateway or the network address translator NAT (as shown in FIG. 3, the correspondence table TB2). In this case, when the core cloud server CCS wants to know the information of the terminal device TD, the core cloud server CCS can only transmit the external Internet protocol address of the terminal device TD to the multi-access edge computing cloud server MEC. However, since the multi-access edge computing cloud server MEC does not know the correspondence between the external Internet protocol address and the internal Internet protocol address Inter_ID, the multi-access edge computing cloud server MEC cannot know which terminal device TD corresponds to this external Internet protocol address. As such, the multi-access edge computing cloud server MEC cannot provide information about the terminal device TD. The following provides a network service system 300 and a network service method 400 for solving this problem.

In one embodiment, as the network service system 300 shown in FIG. 3, the multi-access edge computing cloud server MEC receives the service request from the terminal device TD and records the internal Internet protocol address Inter_ID of the terminal device TD. The core cloud server CCS receives the internal Internet protocol address Inter_ID from the terminal device TD or from the multi-access edge computing cloud server MEC. The core cloud server CCS records the correspondence between the internal Internet protocol address Inter_ID and the external Internet protocol address of the terminal device TD. For example, the core cloud server CCS records the correspondence between the internal Internet protocol address Inter_ID and the external Internet protocol address of the terminal device TD in the database DB.

In one embodiment, database DB be stored in a storage device in the core cloud server CCS. The storage device can be implemented as a read-only memory, a flash memory, a floppy disk, a hard disk, a compact disk, a flash drive, a tape, a network accessible database, or as a storage medium that can be easily considered by those skilled in the art to have the same function.

In one embodiment, the core cloud server CCS is further configured to receive a multi-access edge computing cloud server identifier MEC_ID from the multi-access edge computing cloud server MEC. The core cloud server CCS records the correspondence between the internal Internet protocol address Inter_ID (such as 005 in the correspondence table TB3 in FIG. 3), the multi-access edge computing cloud server identifier MEC_ID and the external Internet protocol address. When the network service system 300 includes a plurality of multi-access edge computing cloud servers MECs, the multi-access edge computing cloud server identifier MEC_ID can help the core cloud server CCS to know a current service request is from which one of the edge computing cloud servers MECs. Then, the network service system 300 queries the multi-access edge computing cloud server MEC requesting the current service request for related information about the terminal device TD.

In one embodiment, the related information such as terminal device TD signal strength, base station BS, location, etc. When the core cloud server CCS receives the related information, the content transmitted to the terminal device TD can be adjusted according to the related information.

In one embodiment, the terminal device TD or the multi-access edge computing cloud server MEC transmits an internal information to the core cloud server CCS. The internal information can include internal Internet protocol address Inter_ID, an international mobile subscriber identity (IMSI) or a mobile subscriber international ISDN number (MSISDN).

In one embodiment, the multi-access edge computing cloud server MEC stores the correspondence between the internal Internet protocol address Inter_ID of the terminal device TD and the external Internet protocol address by the database DB.

In one embodiment, the application corresponding to the service request is used to record the correspondence between the internal Internet protocol address Inter_ID and the external Internet protocol address of the terminal device TD.

In one embodiment, after the terminal device TD is connected to the multi-access edge computing cloud server MEC, the multi-access edge computing cloud server MEC records the correspondence between its own multi-access edge computing cloud server identifier MEC_ID and the internal Internet protocol address Inter_ID. The terminal device TD or the multi-access edge computing cloud server MEC sends the correspondence to the core cloud server CCS, so that the core cloud server CCS can maintain the correspondence.

In one embodiment, the core cloud server CCS can centrally use the database DB to manage the correspondence, or to make the application record of each service request correspond to its own correspondence.

Thus, when the multi-access edge computing cloud server MEC integrates the current state with the application being run by the edge computing cloud server MEC, the multi-access edge computing cloud server MEC can transmit the internal Internet protocol address Inter_ID to the core cloud server CCS, and enable the core cloud server CCS to query the external Internet protocol address corresponding to the internal Internet protocol address Inter_ID. Then, the core cloud server CCS returns the current state of the application corresponding to the external Internet protocol address. On the other hand, when the core cloud server CCS asks the multi-access edge computing cloud server MEC for related information about the terminal device TD, the core cloud server CCS can transmit the external Internet protocol address to the correct multi-access edge computing cloud server MEC according to the multi-access edge computing cloud server identifier MEC_ID (for example, For: 005). The multi-access edge computing cloud server MEC queries the internal Internet protocol address Inter_ID corresponding to the external Internet protocol address.

In addition, the parts not specifically described in FIG. 3 are similar to those in FIG. 1, so they are not described again.

In one embodiment, the network service method 400 shown in FIG. 4 is applied to the terminal device TD, the multi-access edge computing cloud server MEC, the database DB, and the application APP_1. The database DB and application APP_1 are located in the core cloud server CCS. In this example, the terminal device TD accesses the application APP_1 located in the core cloud server CCS, and the application APP_1 wants to query the related information of the terminal device TD.

In step 410, the multi-access edge computing cloud server MEC transmits the multi-access edge computing cloud server identifier to database DB.

In step 420, the terminal device TD transmits the internal Internet protocol address Inter_ID to the database DB.

In step 430, a user information service in the core cloud server CCS obtains an external Internet protocol address from the application APP_1, and the core cloud server CCS queries the database DB for the correspondence of the external Internet protocol address.

In step 440, the user information service in the core cloud server CCS queries the internal Internet protocol address corresponding to the external Internet protocol address and returns the multi-access edge computing cloud server identifier to the application APP_1.

In step 450, the application APP_1 finds the multi-access edge computing cloud server MEC according to the multi-access edge computing cloud server identifier, and the application APP_1 transmits an instruction of signal strength and the internal Internet protocol address to the multi-access edge computing cloud server MEC.

In step 460, the multi-access edge computing cloud server MEC knows the corresponding terminal device TD according to the internal Internet protocol address, and the multi-access edge computing cloud server MEC obtains a signal strength state of the terminal device TD, and the multi-access edge computing cloud server MEC returns the signal strength state to the application APP_1.

In this way, when the core cloud server queries the multi-access edge computing cloud server for related information about the terminal device, the core cloud server can transmit the external Internet protocol address to the correct multi-access edge computing cloud server. The multi-access edge computing cloud server queries the internal Internet protocol address corresponding to the external Internet protocol address. The multi-access edge computing cloud server reports the relevant information of the terminal device to the core cloud server.

The network service system and the network service method can effectively utilize the resources of the multi-access edge computing cloud server. The network service system and the network service method can cooperate with the multi-access edge computing cloud server and the core cloud server to provide non-interruption service. In addition, when the multi-access edge computing cloud server integrates the current state with the application being run by the edge computing cloud server, the multi-access edge computing cloud server can transmit the internal Internet protocol address to the core cloud server. The core cloud server queries the external Internet protocol address corresponding to the internal Internet protocol address. The core cloud server returns the current state of the application corresponding to the external Internet protocol address. On the other hand, when the core cloud server queries the multi-access edge computing cloud server for related information about the terminal device, the core cloud server can transmit the external Internet protocol address to the correct multi-access edge computing cloud server according to the multi-access edge computing cloud server identifier. The multi-access edge computing cloud server queries the internal Internet protocol address corresponding to the external Internet protocol address. The multi-access edge computing cloud server reports the related information of the terminal device to the core cloud server.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A network service system, comprising:
 a core cloud server, configured to return all running service identification information; and
 a multi-access edge computing cloud server, configured to receive a service request from a terminal device,
 wherein the multi-access edge computing cloud server determines whether an application corresponding to the service request exists in the multi-access edge computing cloud server according to the service identification information reported by the core cloud server,
 when the multi-access edge computing cloud server determines that the application corresponding to the service request does not exist in the multi-access edge computing cloud server, the terminal device is directed to the core cloud server, and the core cloud server provides the application to the terminal device,
 the multi-access edge computing cloud server runs the application, and the core cloud server transmits a current state of the application being run by the core cloud server to the multi-access edge computing cloud server, and
 after the multi-access edge computing cloud server integrates the current state with the application being run by the multi-access edge computing cloud server, the terminal device is directed to the multi-access edge computing cloud server, and the multi-access edge computing cloud server provides the application to the terminal device;
 wherein the service identification information comprises a service identification code of the application, an Internet protocol address of the application, and a port number of the application corresponding to the service request.

2. The network service system of claim 1, wherein when the multi-access edge computing cloud server determines that the application corresponding to the service request exists in the multi-access edge computing cloud server, the multi-access edge computing cloud server provides the application directly to the terminal device.

3. The network service system of claim 1, wherein the core cloud server transmits the service identification information to the multi-access edge computing cloud server, and the multi-access edge computing cloud server records the Internet protocol address and the port number corresponding to the application.

4. The network service system of claim 1, wherein after the multi-access edge computing cloud server integrates the current state with the application being run by the multi-access edge computing cloud server, the multi-access edge computing cloud server runs the application having the same current state as the application running on the core cloud server.

5. A network service method, comprising:
 returning all running service identification information from a core cloud server;
 receiving, by a multi-access edge computing cloud server, a service request from a terminal device;
 determining whether an application corresponding to the service request exists in the multi-access edge computing cloud server by the multi-access edge computing cloud server according to the service identification information returned from the core cloud server;
 when the multi-access edge computing cloud server determines that the application corresponding to the service request does not exist in the multi-access edge computing cloud server, the terminal device is directed to the core cloud server, and the core cloud server provides the application to the terminal device; the multi-access edge computing cloud server runs the application, and the core cloud server transmits a current state of the application being run by the core cloud server to the multi-access edge computing cloud server; and
 after the multi-access edge computing cloud server integrates the current state with the application being run by the multi-access edge computing cloud server, the terminal device is directed to the multi-access edge computing cloud server, and the multi-access edge computing cloud server provides the application to the terminal device;

wherein the service identification information comprises a service identification code of the application, an Internet protocol address of the application, and a port number of the application corresponding to the service request.

6. The network service method of claim 5, wherein when the multi-access edge computing cloud server determines that the application corresponding to the service request exists in the multi-access edge computing cloud server, the multi-access edge computing cloud server provides the application directly to the terminal device.

7. The network service method of claim 5, wherein the core cloud server transmits the service identification information to the multi-access edge computing cloud server, and the multi-access edge computing cloud server records the Internet protocol address and the port number corresponding to the application.

8. The network service method of claim 5, wherein after the multi-access edge computing cloud server integrates the current state with the application being run by the multi-access edge computing cloud server, the multi-access edge computing cloud server runs the application having the same current state as the application running on the core cloud server.

9. The network service system of claim 1, wherein the core cloud server is further configured to receive a multi-access edge computing cloud server identifier from the multi-access edge computing cloud server, and record the correspondence between an internal Internet protocol address of the terminal device, the multi-access edge computing cloud server identifier, and an external Internet protocol address of the terminal device.

10. The network service method of claim 5, wherein the core cloud server receives a multi-access edge computing cloud server identifier from the multi-access edge computing cloud server, and records the correspondence between an internal Internet protocol address of the terminal device, the multi-access edge computing cloud server identifier, and an external Internet protocol address of the terminal device.

* * * * *